United States Patent [19]
Navasero

[11] 3,763,797
[45] Oct. 9, 1973

[54] ROW SEEDER

[75] Inventor: Nestor C. Navasero, Los Banos, Philippines

[73] Assignee: The United States of America as represented by the Secretary of Agriculture, Washington, D.C.

[22] Filed: July 14, 1971

[21] Appl. No.: 162,570

[52] U.S. Cl. .................................. 111/77, 222/330
[51] Int. Cl. .............................................. A01c 5/00
[58] Field of Search .................. 111/51, 73, 76, 80; 222/330, 352, 368, 177

[56] References Cited
UNITED STATES PATENTS

| | | | |
|---|---|---|---|
| 9,373 | 11/1852 | Trevitt | 222/330 |
| 262,336 | 8/1882 | Williams | 222/352 X |
| 9,006 | 6/1852 | Sanders | 222/177 X |

Primary Examiner—Robert E. Pulfrey
Assistant Examiner—Stephen C. Pellegrino
Attorney—R. Hoffman et al.

[57] ABSTRACT

A planter for planting rows of seeds, particularly pre-germinated seeds such as rice, comprises a hopper from which seed is fed to a horizontal, longitudinally fluted feed roll which is rotated through a sprocket chain by a ground wheel and the device. Seeds drop from the fluted roll into a distributor from which, in turn, they pass to a plurality of individual seed tubes arrayed transversely to the direction of motion of the device. Gentle curves prevent damage to the delicate seeds which are deposited in furrows produced by openers under the seed tubes.

1 Claim, 3 Drawing Figures

PATENTED OCT 9 1973 3,763,797

ROW SEEDER

This utility relates to a device for planting pre-germinated rice seeds and in particular to a seeder with a two-step metering device for use therein.

Due to high labor requirements of transplanting, it is sometimes desirable to plant rice either by hand seeding or row seeding. Under these circumstances, it is desired to plant rice by soaking the seeds or planting pre-germinated seeds to provide the plant an earlier growth thereby permitting it to get ahead of weeds. Where pre-germinated seed planting is desired, the practice has been to broadcast manually the seeds or to use mechanical seeders.

Spreading manually the seeds over the field tends to produce stands that are too thick in some areas and too thin in others. Also the stant cannot be mechanically weeded without destroying some rice plants.

In row seeding, the previous practice has been to use seed tubes held by a spacer bar. These tubes converged into a distribution box with an outlet from the bottom into each row seeding tube. The operator pulls this seeder at an angle to the ground while walking backwards. He flushes the seed back and forth across the distributing pipe holes to maintain a constant flow of seeds from the seed box and a reasonable uniform distribution down each tube. These, however, suffer from the disadvantage of not being accurate for row seeding and the backward walk is somewhat tiring. In additon, pre-germinated seeds are damaged when brushed past the distirbuting pipe holes.

An object therefore of this utility model is to provide a seeder which overcomes the foregoing disadvantages.

Another object of this utility model is to provide a seeder that is portable and cheap to manufacture.

These and other objects, features and advantages of the instant utility model will be best appreciated from the following detailed description, reference being had to the accompanying drawings wherein.

Figure 1:
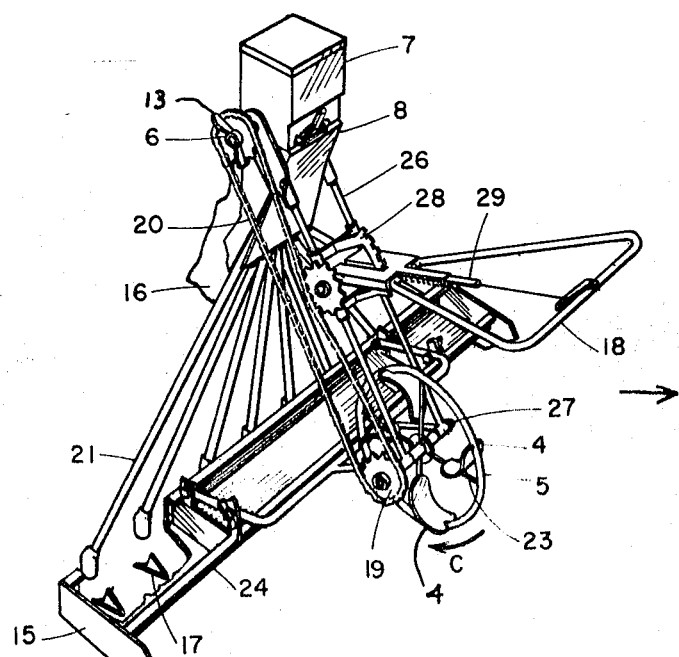
FIG. 1 is a perspective view of the Row Seeder
Figure 2:
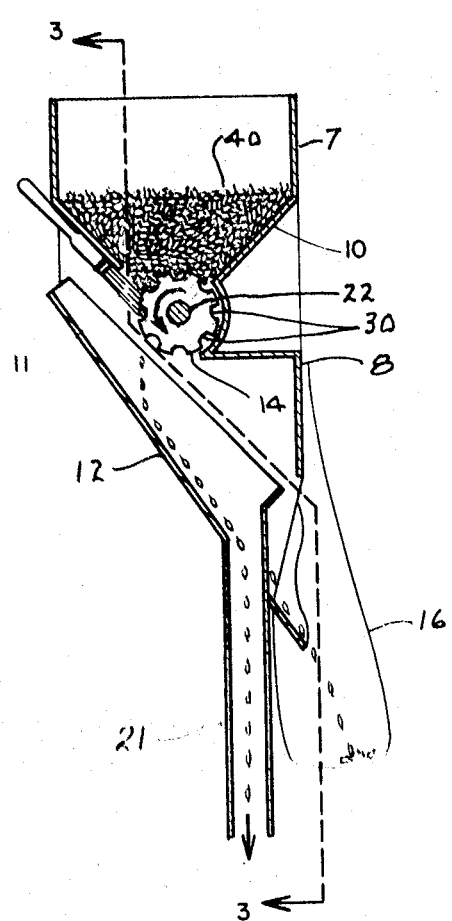
FIG. 2 is a cross sectional view taken along lines 2 of FIG. 3

Referring now to the drawings, the pre-germinated seeds are carried in a seed hopper 7 mounted on a supporting housing 8 which also acts to support the seed metering device 9. The metering device 9 comprises of a fluted roller 14, seed distributor 12 and brush cut-off 11.

Housing 8 in its upper region is rectangular and therebelow is provided with as outlet guide means 10 which conforms to the shape of the fluted roller 14 so as to retain the seed between grooves 30. Preferably made of wood, the fluted roller 14 is cylindrical and is provided with longitudinally extending grooves 30 equally spaced apart on the roller surface.

Referring now to FIG. 1 of the drawings, the drive for fluted roller 14 is provided with sprocket wheel 6 which is driven by the drive wheel 5 and which drives sprocket wheel 19 through chain 20. As the seeder is pulled forward, drive wheel 5 turns as indicated by arrow A and through chain 20 causes the fluted roller 14 to rotate. As the roller rotates, seeds comprise guide channel means to are in the groove 30 drop into seed distributors 12 which guide seed into tubes 21. Seeds which are not in the groove 30 are held back by the bristles of the brush cut-off 11. The rest of the seeds in the groove 30 fall outside the seed distributor 12 and are deposited in the excess seed bag 16.

Figure 3:
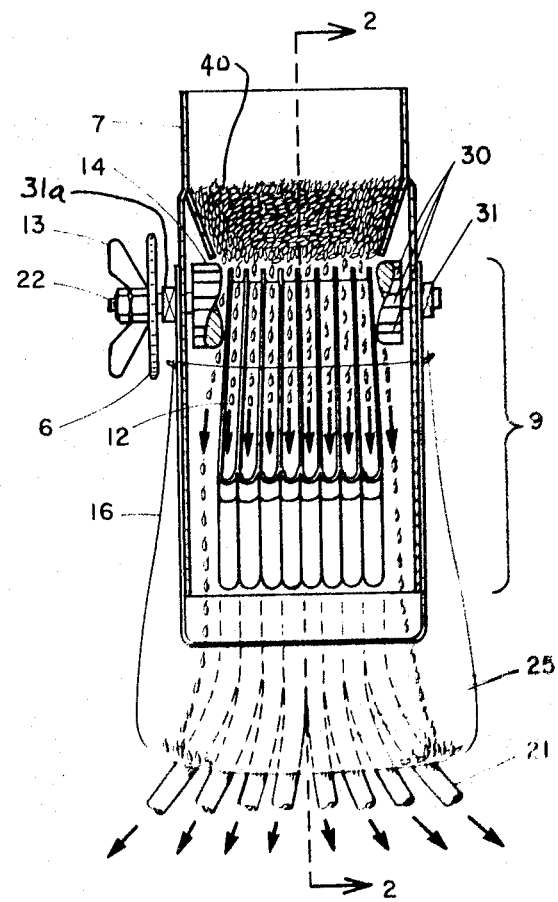
FIG. 3 is a cross sectional view taken along lines 3 of FIG. 2

The roller FIG. 3 is mounted on shaft 22 and attached thereto by suitable bearing 31. A sprocket wheel 6 properly provided with a suitable bearing is fixedly held thereto by wing nut 13.

The drive wheel 5 aside from being the driver of fluted roller 14 also supports the seeder when travelling on hard grounds. Lugs 4 welded to the spokes 23 help in rotating the drive wheel when the seeder is operating on puddled soils.

The seeder is provided with skid 24 for it to slide on puddled soils. Attached to the ends of the skid 24 are plates 15 to prevent endwise movements and thereby permit the seeder to plant seed in straight rows.

To prevent the damage of seeds from pre-emergence herbicide applications, birds and other pest it is desirable to imbed the seed in the mud just below the surface. For this purpose, furrow openers 17 shaped like a wedge and arranged substantially below the pipe holes of the seed tubes 21 are fixedly attached to the undersurfaces of the skid 24.

The seed tubes 21 are curved as indicated at 25 at a pre-determined radius to suit the number of rows desired. Further, the seed tubes 21 expands outwardly from the seeder housing 8 to the skid 24 in a manner necessary to effect a pre-determined distance between rows.

The seeder is provided with metal frames 26 for support. Said frames 26 are hingedly attached to the axle 27 of the drive wheel 5 and are fixedly held at housing 8. Between support 26 and welded thereto is rock 28 with locking lever 29 for making adjustment on the height of the handle 18 so as to suit the operator's height.

Having described the utility model in detail what I claim as new and desire to protect by Letters Patent is:

1. A seeder with a two-step metering device comprising a housing, a hopper in said housing having an outlet means, a longitudinally fluted roller, rotatably mounted within said outlet guide means, a drive wheel on said device with means connected said roller to operate said roller, said roller rotatable to enable the flutes therein, to receive seeds from said hopper, a brush cut-off means mounted adjacent said outlet guide means and engageable with said roller to wipe off seeds which are not in the groove of the roller, a seed distributor mounted adjacent and below the fluted roller to receive seeds said distributor comprising a plurality of guide channel means, seed tubes mounted on said device and arranged to follow pre-determined furrows, each of said guide channel means arranged to direct seed dispensed from said roller flutes into a respective seed tube, a skid mounted on said device and extending transversely ahead of said seed tubes, and furrow openers attached to the undersurface of said skid and in close proximity and is front of the outer ends of said seed tubes.

* * * * *

PO-1050
(5/69)

UNITED STATES PATENT OFFICE
CERTIFICATE OF CORRECTION

Patent No. __3,763,797__ Dated __October 9, 1973__

Inventor(s) __Nestor C. Navasero__

It is certified that error appears in the above-identified patent and that said Letters Patent are hereby corrected as shown below:

Insert in Column 1 of the front sheet, between

"[21] Appl. No. 162,570" and "[52] U. S. Cl. ....... 111/77,

222/330" -- [30] Foreign Application Priority Date

25 Feb. 1971 ..... Philippines UM-762. --.

Signed and sealed this 17th day of September 1974.

(SEAL)
Attest:

McCOY M. GIBSON JR.
Attesting Officer

C. MARSHLL DANN
Commissioner of Patents